(12) United States Patent
Boettcher et al.

(10) Patent No.: US 9,417,665 B2
(45) Date of Patent: Aug. 16, 2016

(54) PROVIDING AN ALTERNATIVE HUMAN INTERFACE

(75) Inventors: Jesse Boettcher, San Jose, CA (US); Jeffery T. Lee, San Jose, CA (US); Aram Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 1258 days.

(21) Appl. No.: 12/825,142

(22) Filed: Jun. 28, 2010

(65) Prior Publication Data

US 2011/0316769 A1   Dec. 29, 2011

(51) Int. Cl.
*G09G 5/00* (2006.01)
*G06F 1/16* (2006.01)
*G06F 3/0481* (2013.01)
*G06F 3/0488* (2013.01)
*G06F 3/01* (2006.01)
*G09G 3/20* (2006.01)

(52) U.S. Cl.
CPC ............ *G06F 1/1694* (2013.01); *G06F 1/1684* (2013.01); *G06F 3/016* (2013.01); *G06F 3/0481* (2013.01); *G06F 3/0488* (2013.01); *G09G 3/20* (2013.01); *G09G 2360/144* (2013.01)

(58) Field of Classification Search
CPC ... G06F 1/1694; G06F 1/1684; G06F 3/0481; G06F 3/0488; G06F 3/016; G09G 3/20; G09G 2360/144

USPC .................................. 345/173, 175, 102, 156
See application file for complete search history.

(56) References Cited

U.S. PATENT DOCUMENTS

| | | | |
|---|---|---|---|
| 6,426,736 B1 | 7/2002 | Ishihara | |
| 6,690,351 B1 | 2/2004 | Wong | |
| 7,117,019 B2 * | 10/2006 | Abbasi | 455/566 |
| 7,552,349 B2 * | 6/2009 | Hassan et al. | 713/320 |
| 7,581,188 B2 * | 8/2009 | Hiles et al. | 715/744 |
| 2006/0026535 A1 | 2/2006 | Hotelling et al. | |
| 2006/0209016 A1 | 9/2006 | Fox et al. | |
| 2008/0077865 A1 | 3/2008 | Hiles et al. | |
| 2009/0160802 A1 * | 6/2009 | Yasumi | 345/173 |
| 2009/0164930 A1 * | 6/2009 | Chen et al. | 715/769 |

* cited by examiner

*Primary Examiner* — Andrew Sasinowski
(74) *Attorney, Agent, or Firm* — Fish Richardson P.C.

(57) ABSTRACT

Providing an alternative human interface for an electronic device when a current human interface is made ineffective by at least an environmental factor is described herein. By ineffective it is meant that the current human interface cannot maintain a minimum level of interactivity between a user and the electronic device in the current or anticipated environment. In addition to maintaining at least a threshold level of interactivity, the configuration of the alternative human interface can take into consideration other factors such as an expected operating state of the electronic device affected by the choice of alternative human interface.

22 Claims, 4 Drawing Sheets

PROVIDING AN ALTERNATIVE HUMAN INTERFACE

TECHNICAL FIELD

The embodiments described herein relate generally to the field of small form factor electronic devices. More particularly, the embodiments describe efficient techniques for providing assistance in the use of the small form factor electronic device.

BACKGROUND

A portable electronic device can take many forms such as, for example, a tablet computing device along the lines of an iPad™, a portable communication device such as an iPhone™, or a portable media player, such as an iPod™ each manufactured by Apple Inc. of Cupertino, Calif. The small size of these devices requires that any on-board power supply, such as a battery, be relatively lightweight, small, and relatively inexpensive thereby limiting an amount of charge that can be stored and made available to operate the portable electronic device. Therefore, in order to maximize an amount of time that the portable electronic device can operate while powered by the battery, the power consumption of the portable electronic device must be optimized for current operating conditions. Optimization of power consumption is particularly important for those portable electronic devices having a display.

The display on the portable electronic device can be used to display visual content (such as an album cover, video, and so forth) related to items (such as songs or music) stored in the portable electronic device. The display can also assist in navigation and control of the portable electronic device by presenting visual aids such as a graphical human interface to a user. Unfortunately, however, depending upon the display technology, the display can consume a substantial amount of power when active. This is especially true of transmissive type displays (such as liquid crystal display, or LCD) that require an illumination source (also referred to as a backlight) that have a particularly high power demand. However, LCDs can be manufactured to be lightweight and thin, making them eminently well suited for use in small form factor portable electronic devices in spite of their high power requirements.

Therefore, a system, method, and apparatus for maintaining the ability of a user to interact with an electronic device are desired.

SUMMARY OF THE DESCRIBED EMBODIMENTS

A small form factor electronic device includes a processor and an interface engine in communication with the processor and a sensor coupled to the processor. The sensor is arranged to detect at least one environmental factor and pass an indication of the detected environmental factor to the processor. The processor and the interface engine cooperate to determine if an environment of the electronic device has changed, identify an updated human interface when the environment has changed, and cause the small form factor electronic device to present the updated human interface only if a level of interactivity corresponding to the updated human interface is at least greater than a threshold level of interactivity.

A method performed by a processor and an interface engine in an electronic device having a sensor coupled to the processor is described. The method can be carried out by detecting at least one environmental factor by the sensor, passing an indication of the detected environmental factor to the processor, determining if an environment of the electronic device is changed from a current environment by the processor based upon the indication received from the sensor, identifying an updated human interface only when the environment is changed, and causing the electronic device to replace the current human interface with the updated human interface only if a level of interactivity provided by the electronic device is greater than a pre-determined level of interactivity and a value of an operating state of the electronic device is greater than a threshold value.

A system includes at least an electronic device, a multi-mode human interface (MMHI) engine associated with the electronic device, and a sensor in communication with the MMHI engine. In the described embodiment, the sensor detects at least one environmental factor and passes an indication of the detected environmental factor to the MMHI engine. The MMHI engine uses the indication of the environmental factor received from the sensor to determine if the environment of the electronic device has changed. When the environment has changed, the MMHI engine identifies an updated MMHI and presents the updated MMHI only when the MMHI engine determines that a level of interactivity between a user and the electronic device in the changed environment is at least maintained when compared to a pre-determined level of interactivity.

In one aspect of the described embodiment, the updated MMHI uses at least two discrete interface modes in order to provide the requisite level of interactivity between the user and the electronic device.

A method can be performed by a processor in an electronic device by presenting a first human interface by the electronic device, the first human interface used to facilitate control of operations carried out by the electronic device in a first environment, the first human interface providing a first level of interactivity in the first environment, detecting a change in an environment of the electronic device from the first environment to a second environment, identifying a second human interface in accordance with the second environment, and presenting the second human interface by the electronic device only if a level of interactivity provided by the second human interface in the second environment is at least equal to the first level of interactivity provided by the first human interface in the first environment.

A non-transitory computer readable medium for storing a computer program executed by a processor in an electronic device in communication with a sensor is described. The computer program includes at least computer code for presenting a current human interface by the electronic device, computer code for detecting at least one environmental factor by the sensor, computer code for passing an indication of the detected environmental factor to the processor, computer code for identifying an updated human interface when it is determined that the environment of the electronic device is changed, and computer code for presenting the updated human interface in place of the current human interface only if a level of interactivity between a user and the electronic device is greater than a pre-determined level of interactivity and a level of an operating state of the electronic device is greater than a level corresponding to a pre-determined operating state.

BRIEF DESCRIPTION OF THE DRAWINGS

The described embodiments and the advantages thereof can best be understood by reference to the following description taken in conjunction with the accompanying drawings.

DETAILED DESCRIPTION OF REPRESENTATIVE EMBODIMENTS

Figure 1:
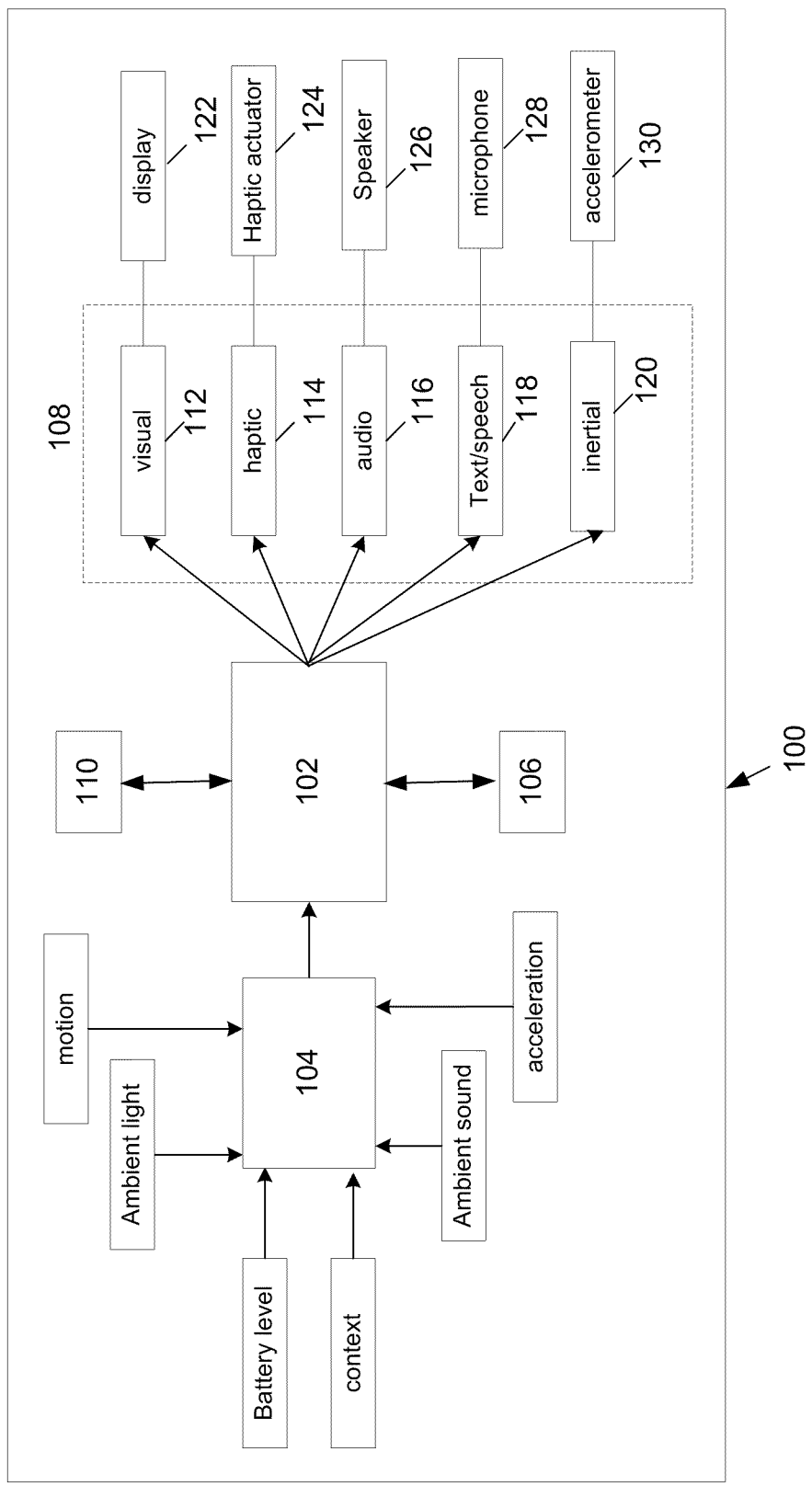
FIG. 1 shows a simplified block description of multi-modal human interface (MMHI) engine in accordance with the described embodiments.
Figure 2:
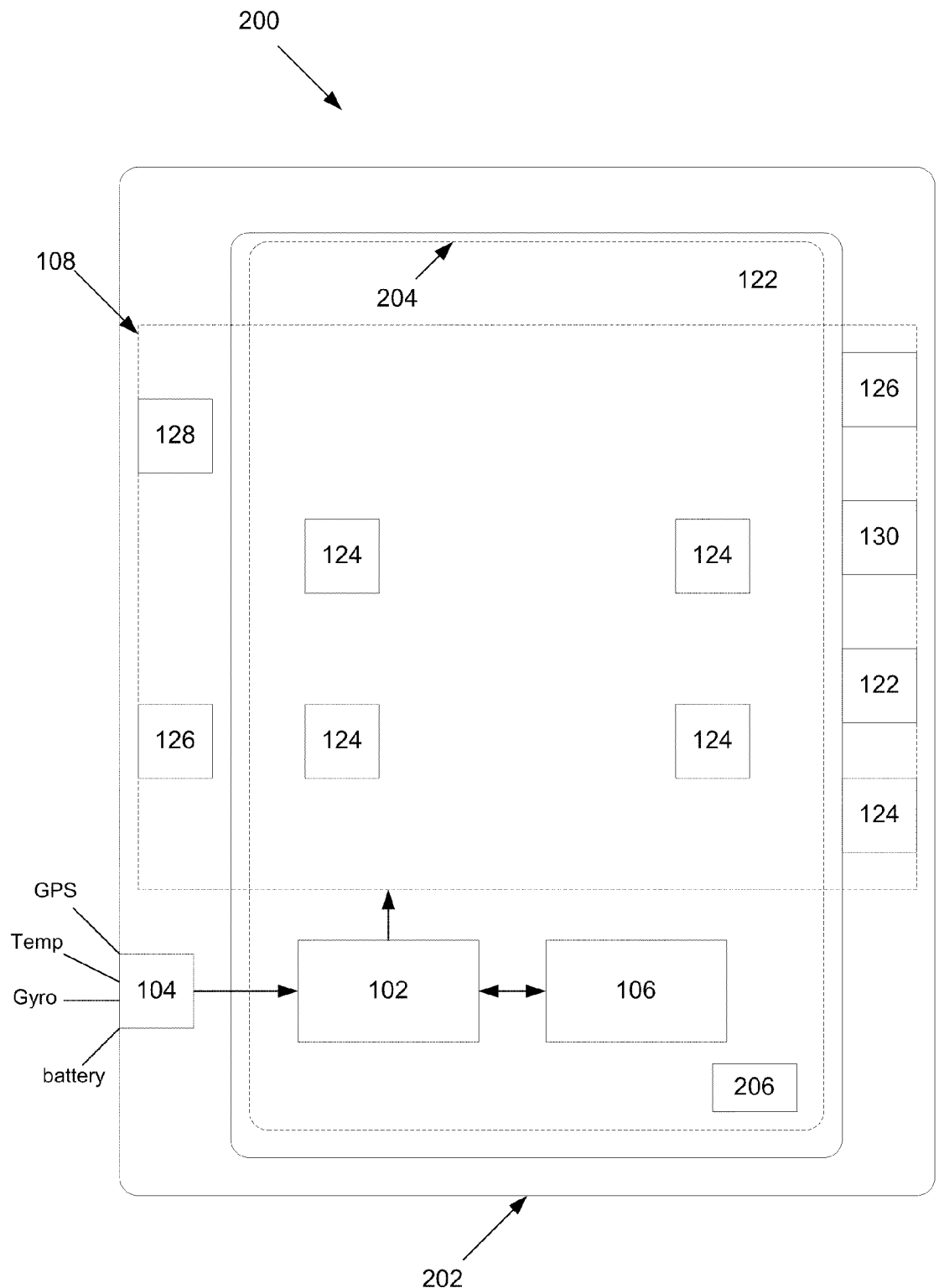
FIG. 2 shows a representative tablet device having an associated MMHI engine along the lines shown in FIG. 1.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Providing an alternative human interface for an electronic device when a current human interface is made ineffective by at least an environmental factor is described herein. By ineffective it is meant that the current human interface cannot maintain a minimum level of interactivity between a user and the electronic device in the current or anticipated environment. By level of interactivity it is meant the ability of a user to interact with the electronic device so as to control or at least influence operations carried out by the electronic device. In addition to maintaining at least a threshold level of interactivity, the configuration of the alternative human interface can take into consideration other factors such as an expected operating state of the electronic device affected by the choice of alternative human interface. For example, if the electronic device is battery powered and presents visual information using a transmissive type display (that requires backlight illumination), then providing an alternative human interface that relies upon enhancing the presentation of the visual content by increasing the amount of light (and therefore power) provided by the backlight in an environment of high ambient light (such as sunlight) is counterproductive to the maintenance of a long battery life.

Accordingly, the alternative human interface in the bright sunlight scenario should rely on mechanisms other than increasing the backlight in part or in whole to maintain the minimum level of interactivity as well as the useful life of the battery. For example, the alternative human interface in a bright light environment can rely upon non-visual interface modes such as a haptic interface mode, an audio interface mode, an inertial interface mode, and so on used singly or in combination. It should be noted that the environmental factors considered when determining an appropriate alternative human interface can include those external to the electronic device such as ambient light, ambient sound, and context of use. The environmental factor considered can also include those internal to the electronic device such as battery level and display technology. The embodiments described are particularly well suited for small form factor battery powered electronic devices having a display and can be implemented automatically based upon the detection of specific environmental factors at predefined levels.

In a particular embodiment, the alternative human interface can take the form of a multi-modal human interface (MMHI) provided by an MMHI engine. The MMHI engine can provide an updated MMHI arranged to automatically maintain a pre-determined level of interactivity between a user and the electronic device. In addition to maintaining at least the pre-determined level of interactivity, the updated MMHI can preserve selected operational resources, such as battery charge, when the electronic device takes the form of a portable computing device powered by a battery. The MMHI engine can automatically detect at least one environmental factor, and if appropriate, provide an updated MMHI along the lines of the alternative human interface described above. The updated MMHI maintains at least the pre-determined level of interactivity by taking into account both external environmental factors such as ambient light and ambient sound as well as internal environmental factors as display technology (if appropriate), battery level, and current electronic device operating state. For example, when coupled with a battery powered portable computing device having an LCD, the MMHI engine can simultaneously monitor environmental factors with special attention to detecting ambient light levels and when necessary (i.e., the detected light level increases beyond a threshold) providing the alternative human interface by updating a currently provided MMHI. In this way, the updated MMHI can maintain at least the pre-determined level of interactivity between the user and the electronic device without requiring substantial amounts of additional battery resources in spite of the increased ambient light level.

Some of the environmental factors that can be detected include at least ambient light level, ambient sound level, current battery charge state, motion and/or acceleration of the portable computing device, and context of use of the portable media device. By context of use it is meant how, where, or why the portable computing device is currently being used. For example, a number of factors that when taken together indicates that the electronic device is currently in an individual's shirt pocket (i.e., correlating ambient light level, piezoelectric sensing indicating the portable computing device is in an confined location, external temperature close to that expected of body temperature, and so on), the MMHI can be updated to an updated MMHI consistent with being located within a shirt pocket. Using the shirt pocket scenario, the updated MMHI would likely rely upon the use of non-visual interactions such as haptic, audio, speech or sound recognition, and inertial (for example, shaking the electronic device).

It should be noted that the MMHI can utilize discrete interface modes individually or in combination. The discrete interface modes can include at least a visual interface mode, a haptic interface mode, an audio interface mode, a speech/sound recognition interface, and an inertial interface mode. For example, the visual interface mode can utilize a display to present visual indicia, such as icons included in a graphical human interface that can assist the user with interacting with the portable computing device. In the case where the portable computing device is a portable media player, the visual indicia provided by the MMHI can include navigation icons, selection icons, and volume increase/decrease icons and so on. When the MMHI engine detects a change in the local environment (the local environment being the external environment as well as the environment internal to the portable media player such as battery level), the MMHI engine can provide an updated MMHI that can provide at least the pre-determined level of interactivity between the user and the portable computing device. For example, if the MMHI engine determines that the portable media player has been placed in an enclosed environment such as a shirt pocket, then the MMHI engine can de-activate any visual interface elements (such as a backlight, for example) and activate other non-visual interface modes such as haptic, audio, inertial, and speech/sound recognition that can be used in combination to maintain at least the pre-determined level of interactivity in the enclosed environment. When the MMHI engine determines that the portable media player has been removed from the enclosed environment, then the MMHI engine can update the MMHI consistent with the most current environment.

These and other embodiments are discussed below with reference to FIGS. 1-6. However, those skilled in the art will readily appreciate that the detailed description given herein with respect to these figures is for explanatory purposes only and should not be construed as limiting.

FIG. 1 shows computing system 100 in accordance with the described embodiments. Computing system 100 can include processor 102 coupled to sensor 104 arranged to detect any number of environmental factors such as ambient light, ambient sound, battery level, context of use, motion and/or acceleration. Sensor 104 can function as, without limitation, an accelerometer, a gyroscope or another motion and/or acceleration sensing device. Sensor 104 can detect at least a change in position, orientation or movement of computing system 100. Typically, accelerometers can measure linear motion and accelerated linear motion directly, while gyroscopes can measure angular motion and angular acceleration directly. In some embodiments, sensor 104 can provide geographical location services to processor 102 along the lines of, for example, GPS, cellular phone location services, and so on. Sensor 104 can detect changes in position, orientation or movement, and acceleration along a number of different reference directions, singly or in combination. Sensor 104 can also detect temperature, pressure, or ambient light and sound, as well as any environmental factor deemed relevant in the context of computing device 100. Sensor 104 can also detect operating conditions within computing system 100 such as individual component function. In this way, when sensor 104 detects that a component has failed or at least as deteriorated in performance, this information can also be provided to processor 102 for evaluation.

Computing system 100 can also include multi-modal human interface (MMHI) engine 106 that in cooperation with processor 102 can cause computing device 100 to generate or otherwise provide multi-modal human interface (MMHI) 108. MMHI engine 106 can take the form of software, hardware, of firmware. For example, as computer software, MMHI engine 106 can be stored on non-transitory computer readable medium in data storage device 110 in the form of executable instructions such as computer code that can be executed by processor 102. During operation, sensor 104 can, in real time, detect an environmental factor. Sensor 104 can pass an indication of the detected environmental factor to processor 102. Processor 102 can respond by determining if a change in a local environment has occurred and if so, is the change of such a magnitude that requires updating MMHI 108. For example, if sensor 104 detects that an ambient light level has increased, sensor 104 can pass an indication of the increased ambient light level to processor 102. Processor 102 can respond by determining if the changed ambient light level is greater than a pre-determined ambient light level and if so can notify MMHI engine 106 of the change. If the change in the local environment is determined to be sufficient to warrant a change in MMHI 108, MMHI 106 can cooperate with processor 102 to instruct computing system 100 to update MMHI 108 in accordance with the changed local environment.

MMHI 108 can utilize resources provided by computing system 100 to present a human interface that uses one or more discrete interface modes that work in cooperation with each other to provide a unified human interface experience. The discrete interface modes can include visual interface mode 112, haptic interface mode 114, audio interface mode 116, speech/text recognition interface mode 118, and inertial mode 120 each of which can utilize specific resources made available by computing system 100. For example, visual interface mode 112 can use imaging resources such as display 122, haptic interface mode 114 can use tactile resources such as haptic actuators 124, audio interface mode 116 can use audio resources such as speaker 126 (and/or piezoelectric transducer), and speech/text recognition mode 118 can utilize audio input resources such as microphone 128. Furthermore, inertial mode 120 can use motion/acceleration resources such as accelerometer 130. In this way, MMHI 108 can optimize a user's ability to interact with computing system 100 while still maintaining acceptable use of computer system 100 resources such as battery charge.

Computing device 100 can take many forms such as a music player, game player, video player, personal digital assistant (PDA), tablet computer and/or the like. For the remainder of this discussion, computing device 100 is described in terms of small form factor electronic device 200 shown in FIG. 2 as tablet device 200. An example of tablet device 200 is the iPad™ manufactured by Apple Inc. of Cupertino, Calif. that can display information in either a landscape mode or portrait mode. Tablet device 200 can include single piece seamless housing 202 sized to accommodate processor 102 and display 122 as well as openings suitable to provide support for speaker 126 and microphone 128. Tablet device 200 can include various touch sensitive components capable of detecting a touch event on or near a touch sensitive surface. The touch sensitive elements can be incorporated into touch sensitive layer 204 that in cooperation with a display layer enable display 120 operate as a touch screen providing a user with the ability to interact with tablet device 200 using a finger or other suitable object. The user can interact with tablet device 200 using only a single finger to provide a single touch event (such as a tap or swipe) or more than one finger moving in a coordinated manner to generate a gesture that can be as simple as a pinching gesture to as complex as providing a touch pattern along the lines of a signature.

Display 122 can include various tactile elements such as haptic actuator 124. In addition to being associated with display 122, haptic actuator 124 can be mounted at any appropriate location of housing 202. In this way, tablet device 200 can communicate information to a user, and vice versa, by providing coordinated tactile sensations at display 122 and/or housing 202. For example, a user can be notified that battery level is too low to present visual content on display 122 at a current ambient light level by a portion of housing 202 vibrating in response to haptic actuator 124. Under these conditions, MMHI engine 106 can determine that further interaction with tablet device 200 should be carried out using primarily audio interface mode 116 and text/speech recognition mode 118. Accordingly, MMHI engine 106 can in cooperation with processor 102 update MMHI 108 to operate primarily using speaker 126 and microphone 128. By primarily it is meant that in addition to the primary interface modes (audio interface mode 116, text/speech recognition mode 118 in this example), MMHI 108 can also use a secondary interface mode such as inertial mode 120 to augment the primary interface modes enabling tablet device 200 to respond to a "shake" event thereby adding yet another dimension to MMHI 108.

As the situation may require, being able to update MMHI 108 in such a way that a user can interact with tablet device 200 without having to rely on visual indicators can be very useful. For example, it would be advantageous to not rely on visual indicators provided by display 122 when display 122 is not viewable or that using display 122 would adversely affect the operation of tablet device 200 by, for example, severely reducing expected operating time at a current operating state. The reduction in expected operating time can be caused by many factors such as the inordinate power drain required to support a transmissive type display in an environment of high ambient light. For example, as well known in the display arts, transmissive displays rely upon an external light source (referred to as a backlight when used in the context of a liquid crystal display, or LCD) to provide images for viewing. The backlight can require substantial amounts of power to operate in even the most optimal light conditions. However, when light conditions change (going from dark to bright, for example) there may not be sufficient power resources available to drive display 122 in the bright environment sufficient to overcome the ambient light conditions. The bright light can "wash" out any images presented on display 122 severely restricting the ability of a user to interact with tablet device 200.

In order to maintain the ability of the user to interact with tablet device 200 as well as maintaining battery charge and therefore expected battery life, MMHI 108 can be updated in such as way as to not rely on display 122 (or at least substantially reduce the reliance on display 122). Interactivity previously provided by display 122 (and more precisely display 122 and touch sensitive layer 204) can be provided in the alternative by other interface mechanisms acting singly or in cooperation with each other. For example, with display 122 effectively out of the loop so to speak, haptic actuator 124 and/or speaker 126 can be used separately or in tandem to provide a human interface that at least preserves the ability of a user to interact with tablet device 200 as well as preserve battery charge. The preservation of battery charge can also prolong useful operation of tablet 200 than would otherwise be possible using display 122 as the primary mode of interaction.

During operation, sensor 104 can detect any one or more of a plurality of environmental factors. The plurality of environmental factors can include at least temperature (both internal and external to tablet device 200), battery charge level, ambient light, ambient sound, and so on. Sensor 104 can provide an indication of the detected environmental factor(s) to processor 102. Processor 102 can use the indication of the detected environmental factors to evaluate a current state of the local environment and, in turn, determine an ability of a user to interact with tablet device 200. If the ability of the user to interact with tablet device 200 is determined to be less than a threshold value, then processor 102 in cooperation with MMHI engine 106 can update MMHI 108 in such a way as to preserve the ability of the user to interact with tablet device 200. In some cases it may be desirable to take into consideration the effect of updating MMHI engine 108 on an expected operating state of tablet device 200 prior to actually updating MMHI 108. For example, if processor 102 estimates a substantial reduction in operating life of tablet device 200 using a first version of MMHI 108, then processor 102 can modify the first version of MMHI 108 to a second version of MMHI 108 that specifically reduces the impact on operating life. It should be noted that the updated MMHI is not one that is necessarily available during normal use of tablet device 200 (for example, a haptic interface might not normally be provided as an interface option during normal operation but can be made available when operating conditions fall below a desired operability level).

For example, when the environmental factor data received from sensor 104 includes an indication of a battery charge level and an indication of ambient light level greater than a threshold level, then processor 102 can use the environmental factor data received from sensor 104 in addition to extrinsic data such as a display technology used by tablet device 200 to update MMHI 106. Furthermore, processor 102 can estimate an expected amount of time that tablet device 200 can operate using the current battery charge level in the changed environment assuming that the updated MMHI 108 is used. In one embodiment, when the expected amount of operating time is deemed to less than a pre-determined operating time (i.e., too short) then processor 102 can cause tablet device 200 to post a notification indicating as such and/or further update MMHI 108 in order to increase the expected operating time of tablet device 200. It should be noted that operating temperature of tablet device 200 can be an environmental factor due to its effect on battery longevity.

Figure 5:
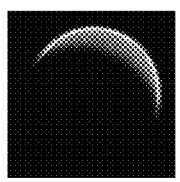
FIGS. 3-5 graphically illustrate the ability of MMHI engine to update a MMHI in accordance with various embodiments.
Figure 5:
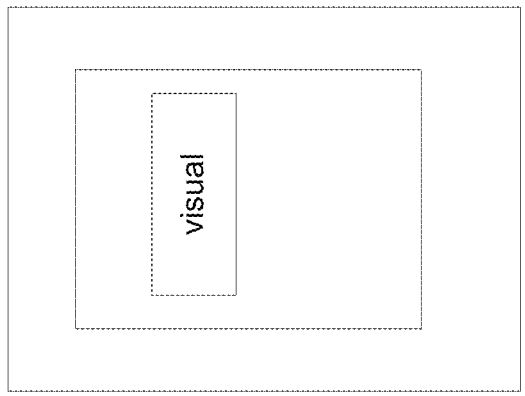
Figure 4:
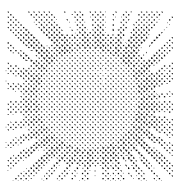
Figure 4:
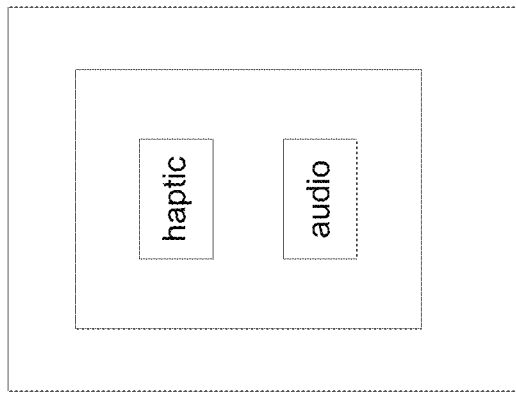
Figure 3:
Figure 3:
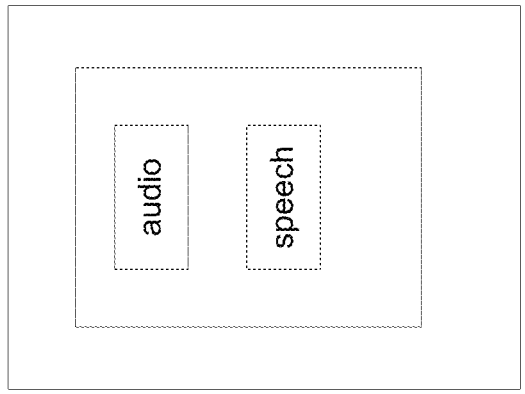

FIGS. 3-5 graphically illustrate various configurations of MMHI 108 based upon representative local environments detected by sensor 104 and evaluated by processor 102 in cooperation with MMHI engine 106. For example, FIG. 3 shows a situation whereby tablet device 200 is exposed to an environment having little or no ambient light, such as at night. In this situation, sensor 104 can detect ambient light levels corresponding to dark conditions (such as night or in a dark room). The information can be passed to processor 102 for evaluation in cooperation with MMHI engine 106. As part of the evaluation process, MMHI engine 106 can take into consideration any factors deemed relevant. Such factors can include the display technology used (transmissive or transreflective), the state of charge of a battery when tablet 200 is not receiving power externally, and so on. Using the example of a transmissive type display, when processor 102 and MMHI 106 evaluate the low ambient light levels, MMHI 106 can consider 1) the fact that display 122 is transmissive, 2) the fact that tablet device 200 is not receiving external power, 3) a current state of battery 206, 4) a current operating state of tablet device 200, and 5) an anticipated duration of operation to decide whether or not to update MMHI 108 and the particular configuration that the updated MMHI 108 will take. In this example, the fact that the ambient light level is low, MMHI engine 106 would give more weight to relying upon visual indicators provided by display 122 since low light levels is close to an ideal environment for display 122 to operate relatively efficiently. However, even with low ambient light levels well suited for use of visual interface mode 112, if battery 206 is determined to be low in charge and continued operation of display 122 would result in less than desirable remaining operating time, then MMHI engine 106 can update MMHI 108 to use other, less energy intensive interface modes to maintain the appropriate level of interactivity between the user and tablet device 200.

FIG. 4 shows a situation where the local environment of tablet device 200 has changed from one of low ambient light of FIG. 3 to one of high ambient light as one would expect from bright sunshine. In this case, sensor 104 would notify processor 102 of the change in ambient light levels which would then determine if the change was sufficient to notify MMHI engine 106 that it may be necessary to update MMHI 108 from its current state to an updated state in keeping with the changed local environment. In this way when it has been determined that MMHI 106 is to be updated, MMHI engine 106 in cooperation with processor 102 can update MMHI 108 to minimize the use of display 122 by relying less on visual interface mode 112 and more on haptic interface mode 114 and audio interface mode 116. In this way, not only is the ability of the user to interact with tablet device 200 at least maintained, by power consumption can be reduced with the added benefit of longer operational time at the current operating state.

In yet another situation, FIG. 5 illustrates MMHI 108 configured to operate in "driving mode" when sensor 104 detects that is moving at greater than a threshold speed, such as for example, 20 mph indicating motion in a moving vehicle. In this situation, processor 102 and MMHI 106 can cause MMHI 108 to rely upon a more limited range of interface modes consistent with safe driving (the presumption being that the user is driving the vehicle, be it car or bike) and tablet device 200 should not provide a distraction. In this way, MMHI 108 can be configured by processor 102 in cooperation with MMHI engine 106 to rely upon audio interface mode 116 by way of speaker 126 and/or speech/sound recognition mode 118 and microphone 128 in order to maintain user interactivity in a safe driving environment.

Figure 6:
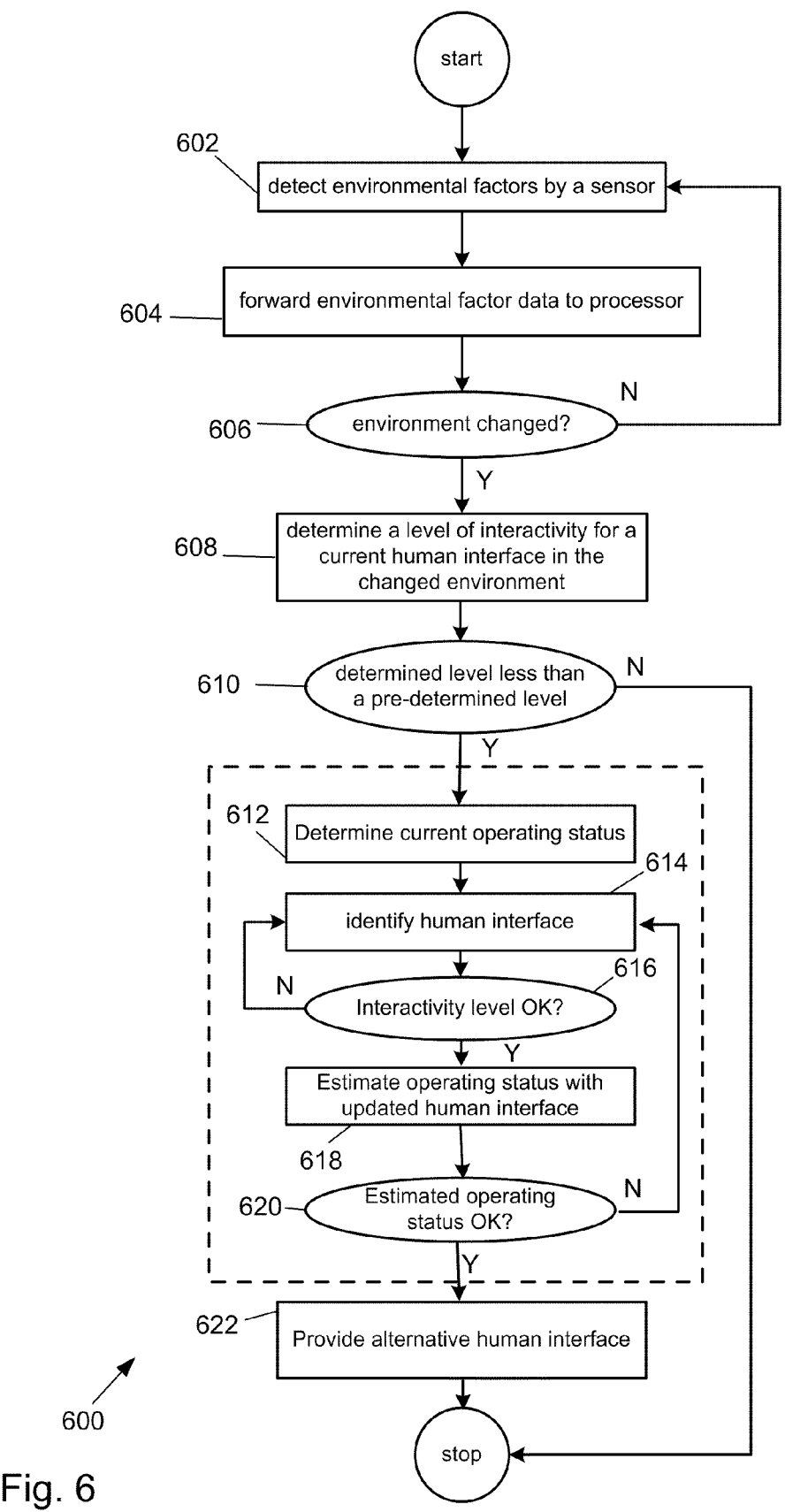
FIG. 6 shows a flowchart detailing a process in accordance with the described embodiments.

FIG. 6 shows a flowchart detailing process 600 performed by an electronic device having at least a processor and environmental sensor in accordance with the described embodiments. Process 600 can be carried out by performing at least the following operations. At 602, the sensor detects at least an environmental factor. The environmental factor can include those factors external to the electronic device such as ambient light level and ambient sound level. The environmental factor can also include those factors internal to the device such as remaining battery charge, display technology, component functionality, and so on. At 604, the sensor converts the detected environmental factors to environmental factor data that is then forwarded to the processor. The processor at 606 determines whether or not the environment of the electronic device has changed. In the described embodiment, the processor can determine when the environment has changed by comparing currently received environmental factor data to historical environmental factor data. It should be noted that the change in environmental factor can be compared to a threshold change in order to eliminate any small changes that may occur that will not materially affect the electronic device's operation or the ability of a user to interact with the device. If, at 606, the processor has determined that the environment has not changed, then control is passed back to 602, otherwise, at 608 a level of interactivity for the current human interface is determined. The level of interactivity can be estimated using the environmental factor data received from the sensor. For example when the electronic device uses a transmissive type display, and if the environment has changed to one of increased ambient light, then the processor can estimate a decrease in the level of interactivity in the changed environment.

If at 610, the level of interactivity is not less than a pre-determined (also referred to as threshold) level then process 600 ends, otherwise, control is passed to 612 where a current operating state of the electronic device is determined. The current operating state of the electronic device can take into consideration such environmental factors as remaining battery charge as well as an intrinsic characteristic of the electronic device as display technology. Next at 614, an updated human interface is identified by the processor. A determination is then made at 616 of the level of interactivity based upon the updated human interface. If the level of interactivity is less than the pre-determined level of interactivity, then control is passed back to 614 for a further updating of the human interface, otherwise, control is passed to 618 for an estimate of the operating status of the electronic device based upon the updated human interface. The estimated operating status of the electronic device can be, for example, an estimated duration of time of useful operation by the electronic device in the changed environment using the updated human interface. This estimate can be made by considering such factors as remaining battery life, power consumption by various function blocks such as a display. If at 620, the estimated operating status is not acceptable using the updated human interface, and then control is passed to 614 for further updating of the human interface, otherwise, the updated human interface is provided at 622.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

The embodiments were chosen and described in order to best explain the underlying principles and concepts and practical applications, to thereby enable others skilled in the art to best utilize the various embodiments with various modifications as are suited to the particular use contemplated. It is intended that the scope of the embodiments be defined by the following claims and their equivalents.

What is claimed is:

1. A small form factor electronic device, comprising:
a processor;
an interface engine in communication with the processor; and
a sensor coupled to the processor arranged to:
detect at least one environmental factor, and
pass an indication of the detected environmental factor to the processor, wherein the processor and the interface engine cooperate to:
determine that an environment of the electronic device has changed based on the indication of the detected environmental factor,
identify an updated human interface in response to determining that the environment has changed,
determine that a level of interactivity corresponding to the updated human interface is at least greater than a threshold level of interactivity, and
cause the small form factor electronic device to present the updated human interface only if the level of interactivity corresponding to the updated human interface is at least greater than the threshold level of interactivity.

2. The electronic device as recited in claim 1, further comprising:
  a display device arranged to present visual content as directed by the processor; and
  a battery used to provide power to the electronic device, wherein at least one of the environmental factors is an amount of charge remaining in the battery.

3. The electronic device as recited in claim 2, wherein when the processor has determined that the environment has changed, the processor is further arranged to:
  determine a value of an operating state of the electronic device, and
  cause the electronic device to present the updated human interface only if the value of the operating state of the electronic device in the changed environment using the updated human interface is greater than a pre-determined value.

4. The electronic device as recited in claim 3, wherein the value of the operating state comprises at least one of:
  a charge remaining in the battery; or
  an estimated amount of operating time for the electronic device at a current operating state in the changed environment using the updated human interface.

5. The electronic device as recited in claim 1, wherein the at least one environmental factor includes at least one of an ambient light level, an ambient sound level, a battery level, a context of use of the electronic device, or a motion of the electronic device.

6. The electronic device as recited in claim 1, wherein the updated human interface comprises at least one of a plurality of interface modes, the plurality comprising:
  a visual interface mode;
  a haptic interface mode;
  an audio interface mode;
  a speech/sound recognition mode; and
  an inertial mode.

7. The electronic device as recited in claim 6, wherein the updated human interface further comprises:
  at least two of the plurality of interface modes.

8. A method performed by a processor and an interface engine in an electronic device, the processor in communication with a sensor, comprising:
  detecting at least one environmental factor by the sensor;
  passing an indication of the detected environmental factor to the processor;
  determining that an environment of the electronic device is changed from a current environment by the processor based upon the indication received from the sensor based on the indication of the detected environmental factor,
  identifying an updated human interface only when the environment is changed in response to determining that the environment has changed;
  determining that a level of interactivity provided by the electronic device is greater than a pre-determined level of interactivity and a value of an operating state of the electronic device is greater than a threshold value; and
  causing the electronic device to replace the current human interface with the updated human interface upon determining that the level of interactivity provided by the electronic device is greater than the pre-determined level of interactivity and the value of the operating state of the electronic device is greater than the threshold value.

9. The method as recited in claim 8, further comprising:
  providing power to the electronic device by a battery, wherein at least one of the environmental factors is an amount of charge remaining in the battery, and wherein the value of the operating state is duration of time for the electronic device to operate with the amount of charge remaining in the battery using the updated human interface.

10. The method as recited in claim 8, wherein the at least one environmental factor includes at least one of an ambient light level, an ambient sound level, a battery level, a context of use of the electronic device, or a motion of the electronic device.

11. The method as recited in claim 8, wherein the determining comprises:
  comparing a difference between the detected environmental factor corresponding to the indication received from the sensor and a current environmental factor, wherein the environment is changed when the difference is greater than a threshold value.

12. A system, comprising:
  an electronic device;
  a multi-mode human interface (MMHI) engine associated with the electronic device; and
  a sensor in communication with the MMHI engine arranged to:
    detect at least one environmental factor, and
    pass an indication of the detected environmental factor to the MMHI engine, wherein the MMHI engine determines that the environment of the electronic device has changed based on the indication of the environmental factor received from the sensor identifies an updated MMHI in response to determining that the environment has changed, determines that a level of interactivity between a user and the electronic device in the changed environment is at least maintained when compared to a pre-determined level of interactivity, and presents the updated MMHI in response to determining the level of interactivity between the user and the electronic device in the changed environment is at least maintained when compared to the pre-determined level of interactivity.

13. The system as recited in claim 12, wherein the electronic device further comprises:
  a processor, wherein the processor includes processing resources some of which are used to implement the MMHI engine.

14. The system as recited in claim 12, wherein the updated human interface comprises at least two discrete interface modes.

15. The system as recited in claim 14, wherein discrete interface modes includes at least one of a visual interface mode, a haptic interface mode, an audio interface mode, a speech/sound recognition interface mode, or an inertial mode.

16. A method, comprising:
  presenting a first human interface by an electronic device, the first human interface used to facilitate control of operations carried out by the electronic device in a first environment, the first human interface providing a first level of interactivity in the first environment;
  detecting a change in an environment of the electronic device from the first environment to a second environment;
  identifying a second human interface in accordance with the second environment;
  determining that a level of interactivity provided by the second human interface in the second environment is at least equal to the first level of interactivity provided by the first human interface in the first environment; and presenting the second human interface by the electronic device in response to determining that the level of interactivity provided by the second human interface in the second environment is at least equal to the first level of interactivity provided by the first human interface in the first environment.

17. The method as recited in claim 16, wherein at least a portion of the first human interface is presented by the electronic device on a display.

18. The method as recited in claim 16, wherein the updating the first human interface to the second interface, comprises:

receiving an indication of the change in the environment of the electronic device from the first environment to the second environment;

updating the first interface to the second interface based at least upon the received indication of the change in the environment of the electronic device; and determining the level of interactivity of the second interface in the second environment.

19. The method as recited in claim 16, further comprising:

prior to presenting the second human interface, determining an expected operating state of the electronic device in the second environment when the electronic device is presenting the second human interface;

presenting the second human interface only if the expected operating state is greater than a baseline operating state.

20. A non-transitory computer readable medium for storing computer program executed by a processor in an electronic device in communication with a sensor, to perform operations comprising:

presenting a current human interface by the electronic device;

detecting at least one environmental factor by the sensor;

passing an indication of the detected environmental factor to the processor;

identifying an updated human interface when it is determined that the environment of the electronic device is changed;

presenting the updated human interface in place of the current human interface only if a level of interactivity between a user and the electronic device is greater than a pre-determined level of interactivity and a level of an operating state of the electronic device is greater than a level corresponding to a pre-determined operating state.

21. The computer readable medium as recited in claim 20, the operations further comprising:

providing power to the electronic device by a battery, wherein at least one of the environmental factors is an amount of charge remaining in the battery, and wherein the level of the operating state is duration of time for the electronic device to operate with the amount of charge remaining in the battery using the updated human interface.

22. The computer readable medium as recited in claim 20, wherein the at least one environmental factor includes at least one of ambient light, battery level, context of use, or motion.

* * * * *